(12) United States Patent
Alles et al.

(10) Patent No.: US 7,738,836 B2
(45) Date of Patent: Jun. 15, 2010

(54) SYSTEM AND METHOD OF OPERATION FOR NETWORK OVERLAY GEOLOCATION SYSTEM WITH REPEATERS USING AM GOLAY HADAMARD SIGNATURES

(75) Inventors: Martin Alles, Hamilton Parish (BM); Joseph P. Kennedy, Jr., Great Falls, VA (US); John Peter Carlson, Dulles, VA (US)

(73) Assignee: Andrew Corporation, Westchester, IL (US)

( * ) Notice: Subject to any disclaimer, the term of this patent is extended or adjusted under 35 U.S.C. 154(b) by 966 days.

(21) Appl. No.: 10/566,589

(22) PCT Filed: Sep. 24, 2004

(86) PCT No.: PCT/US2004/031606

§ 371 (c)(1),
(2), (4) Date: Aug. 21, 2006

(87) PCT Pub. No.: WO2005/048610

PCT Pub. Date: May 26, 2005

(65) Prior Publication Data

US 2007/0087689 A1    Apr. 19, 2007

Related U.S. Application Data

(60) Provisional application No. 60/505,852, filed on Sep. 26, 2003.

(51) Int. Cl.
*H04B 3/36* (2006.01)

(52) U.S. Cl. .............................. 455/9; 455/16; 455/17; 455/22

(58) Field of Classification Search ....................... None
See application file for complete search history.

(56) References Cited

U.S. PATENT DOCUMENTS 4,783,744 A    11/1988   Yueh (Continued)

FOREIGN PATENT DOCUMENTS

JP    60-347529    12/1994

OTHER PUBLICATIONS

Leshem, et al., "Array Calibration in the Presence of Multipath," IEEE Transactions of Signal Processing, vol. 48, No. 1, pp. 53-59, Jan. 1, 2000.

(Continued)

*Primary Examiner*—Philip J Sobutka
(74) *Attorney, Agent, or Firm*—Duane Morris, LLP (57) ABSTRACT

A novel system and method for a network overlay geolocation system operating in a host wireless communication system with repeaters is disclosed. Embodiments of the novel system and method enable a wireless communication system to determine if signals being received by system receivers arrive directly from a target mobile appliance or if the signals are passing through or via a repeater. In an embodiment, the system's repeaters use a co-channel AM Golay Hadamard sequence multiplied by an uplink signal to watermark the repeated signal. The system uses the known AM Golay Hadamard sequences of the repeaters and the waveform of the received uplink signal to detect whether a repeater has operated on the signal and which repeater operated on the uplink signal. Embodiments of the novel system and method provide system management data and can be used to provide more accurate geolocation of mobiles served by repeater stations.

46 Claims, 6 Drawing Sheets

U.S. PATENT DOCUMENTS

| | | | |
|---|---|---|---|
| 5,023,930 | A | 6/1991 | Leslie |
| 5,317,323 | A | 5/1994 | Kennedy, Jr. et al. |
| 5,465,289 | A | 11/1995 | Kennedy, Jr. et al. |
| 5,506,863 | A | 4/1996 | Meidan |
| 5,600,706 | A | 2/1997 | Dunn et al. |
| 5,870,029 | A | 2/1999 | Otto et al. |
| 5,973,643 | A | 10/1999 | Hawkes et al. |
| 6,144,711 | A | 11/2000 | Raleigh et al. |
| 6,188,351 | B1 | 2/2001 | Bloebaum |
| 6,212,391 | B1 | 4/2001 | Saleh et al. |
| 6,295,455 | B1 | 9/2001 | Fischer et al. |
| 6,311,043 | B1 | 10/2001 | Haardt et al. |
| 6,334,059 | B1 | 12/2001 | Stilp et al. |
| 6,470,195 | B1 | 10/2002 | Meyer |
| 6,477,161 | B1 | 11/2002 | Hudson et al. |
| 6,501,955 | B1 * | 12/2002 | Durrant et al. .............. 455/7 X |
| 6,553,322 | B1 | 4/2003 | Ignagni |
| 6,782,264 | B2 | 8/2004 | Anderson et al. |
| 6,834,234 | B2 | 12/2004 | Scherzinger et al. |
| 6,839,539 | B2 | 1/2005 | Durrant et al. |
| 6,845,240 | B2 | 1/2005 | Carlson et al. |
| 6,922,170 | B2 | 7/2005 | Alexander, Jr. |
| 2001/0053140 | A1 | 12/2001 | Choi et al. |
| 2002/0094821 | A1 | 7/2002 | Kennedy, Jr. |
| 2003/0083008 | A1 | 5/2003 | Baker et al. |
| 2003/0162550 | A1 | 8/2003 | Kuwahara et al. |
| 2003/0190919 | A1 | 10/2003 | Niemenmaa |
| 2003/0220075 | A1 | 11/2003 | Baker et al. |
| 2004/0043775 | A1 | 3/2004 | Kennedy, Jr. et al. |

OTHER PUBLICATIONS

Ziskind, I., Wax, M., "Maximum likelihood localization of multiple sources by alternating projection", IEEE Trans. Acoust., Speech, Signal Process. vol. 36, No. 2 (Oct. 1988), 1553-1560.

Van Der Veen, M, Papadias, C.B., Paulraj, A.J., "Joint angle and delay estimation" IEEE Communications Letters vol. 1-1 (Jan. 1997), 12-14.

Schmidt, R.O. "Multiple emitter location and signal parameter estimation" Proc. RADC Spectrum Estimation Workshop, (Mar. 1999), 243-258.

Paulraj, A.J., Papadias, C.B., "Space-Time Signal Processing for Wireless Communications", IEEE Signal Processing Magazine, vol. 11 (Nov. 1997), 49-83.

Haardt, Brunner and Nossek Joint Estimation of 2-D Arrival Angles, Propagation Delays, and Doppler Frequencies in Wireless Communications, Proc. IEEE Digital Signal Processing Workshop, vol. 1, pp. 1-4, Bryce Canyon National Park, Utah, Aug. 1998.

M.Wax, "Position location from sensors with position uncertainty", IEEE Trans. Aero., Elect. Syst. AES-19, No. 2 (Sep. 1983), 658-662.

D.J. Torrieri. "Statistical Theory of Passive Location Systems", IEEE Trans. Aerosp. Electron. Syst. AES-20, No. 2 (Mar. 1984), 183-198.

Y.T. Chan and K.C. Ho, "A simple and efficient estimator for hyperbolic location", IEEE Trans. Signal Proc. 42, No. 8 (Aug. 1994), 1905-1915.

W.H. Foy. "Position location solutions by Taylor series estimation", IEEE trans Aerosp. Electron. System AES-12, No. 2 (Mar. 1976), 187-194.

R.G. Stansfield, "Statistical theory of DF fixing", Journ. IEE 94, part IIIa (Oct. 1947), 762-770.

M.P. Wylie and J. Holtzman, "The non-line of sight problem in mobile location estimation". Proc. IEEE 5thIinternational Conf. on Universal Personal Communications, vol. 2 (Oct. 1996), 827-831.

N.J. Thomas, D.G.M. Cruickshank and D.I.Laurenson, "Performance of a TDOA-AOA hybrid mobile location system" 3G Mobile Communication Technologies Conf. Proc. 1 (Mar. 2001), 216-220.

Caffery, J., Jr., et al., "Subscriber Location in CDMA Cellular Networks," IEEE Transactions on Vehicular Technology, vol. 47, No. 2, May 1998.

Chen, et al. "Joint Angle and Delay estimation of DS-CDMA communication systems . . . Space-time 2D Rake Receivers", IEEE Transactions on Signals, (Jan. 1999).

Paulraj, A.J., Papadias, C.B., "Space-Time Signal Processing for Wireless Communications: A Survey" Information System Laboratory, Stanford University, Apr. 16-18, 1997.

L.Cong and W.Xuang, "Non-Line-of-Sight Error Mitigation in TDOA mobile location" Proc. IEEE Global Telecommunications conference, vol. 1, Nov. 25-29, 2001, 680-684.

P.C. Chen, "A non-line-of-sight error mitigation algorithm in location estimating" Proc. IEEE Conf. on Wireless Communications Networking, vol. 1, 316-320, Sep. 21-24, 1999.

Caffery, J., Jr., "A New Approach to the Geometry of TOA Location," IEEE, VTC 2000, pp. 1943-1949, Sep. 24-28, 2000.

\* cited by examiner

SYSTEM AND METHOD OF OPERATION FOR NETWORK OVERLAY GEOLOCATION SYSTEM WITH REPEATERS USING AM GOLAY HADAMARD SIGNATURES

CROSS REFERENCES

The present application is co-pending with and claims priority benefit of provisional application entitled "SYSTEM AND METHOD FOR NETWORK OVERLAY GEOLOCATION SYSTEM WITH REPEATERS USING AM GOLAY HADAMARD SIGNATURE", Application Ser. No. 60/505,852 and filed on 26 Sep. 2003, the entirety of which is hereby incorporated herein by reference.

The present application is related to and co-pending with applications titled "A NETWORK OVERLAY GEO-LOCATION SYSTEM WITH SMART ANTENNAS AND METHOD OF OPERATION" Serial Number PCT/US03/32578, "A SYSTEM AND METHOD FOR ENHANCING THE ACCURACY OF A LOCATION ESTIMATE" Serial Number PCT/US03/32584, "NETWORK OVERLAY LOCATION SYSTEM AND METHOD FOR AIR INTERFACE WITH FREQUENCY HOPPING" Serial Number PCT/US03/32579, "A SYSTEM AND METHOD FOR ESTIMATING THE MULTI-PATH DELAYS IN A SIGNAL USING A SPATIALLY BLIND ANTENNA ARRAY, Serial Number PCT/US03/32585, and "WIRELESS COMMUNICATION NETWORK MEASUREMENT DATA COLLECTION USING INFRASTRUCTURE OVERLAY-BASED HANDSET LOCATION SYSTEMS" Serial Number PCT/US03/32583, filed Oct. 16, 2003, the entirety of each of these applications is incorporated herein by reference.

BACKGROUND

Applicant's disclosure is directed generally towards a wireless communications network for determining whether a signal from a mobile appliance is operated on by a repeater thereby further enabling a determination of the location of mobile appliances.

The use of wireless communication devices such as telephones, pagers, personal digital assistants, laptop computers, etc., hereinafter referred to collectively as "mobile appliances," has become prevalent in today's society. Recently, at the urging of public safety groups, there has been increased interest in technology which can determine the geographic position or geolocate a mobile appliance in certain circumstances. For example, the Federal Communication Commission (FCC) has issued a geolocation mandate for providers of wireless telephone communication services that puts in place a schedule and an accuracy standard under which the providers of wireless communications must implement geolocation technology for wireless telephones when used to make a 911 emergency telephone call (FCC 94-102 E911).

In addition to E911 emergency related issues, wireless telecommunications providers are developing location-enabled services for their subscribers including roadside assistance, turn-by-turn driving directions, concierge services, location-specific billing rates and location-specific advertising.

To support FCC E911 rules to locate wireless 911 callers, as well as the location enabled services, the providers of wireless communication services are installing mobile appliance location capabilities into their networks. In operation, network overlay location systems take measurements on RF transmissions from mobile appliances at base station locations surrounding the mobile appliance, and estimate the location of the mobile appliance with respect to the base stations. Because the geographic location of the base stations is known, the determination of the location of the mobile appliance with respect to the base station permits the geographic location of the mobile appliance to be determined. The RF measurements of the transmitted signal at the base stations can include time of arrival, angle of arrival, signal power, or unique/repeatable radio propagation path (radio fingerprinting) derivable features. In addition, the geolocation systems can also use collateral information, e.g., information other than that derived for the RF measurement to assist in the geolocation of the mobile appliance, i.e., location of roads, dead-reckoning, topography, map matching, etc.

In a network-based geolocation system, the mobile appliance to be located is typically identified and radio channel assignments determined by (a) monitoring the control information transmitted on radio channel for telephone calls being placed by the mobile appliance or on a wireline interface to detect calls of interest, i.e., 911, (b) producing a location request provided by a non-mobile appliance source, i.e., an enhanced services provider. Once a mobile appliance to be located has been identified and radio channel assignments determined, the location determining system is first tasked to determine the geolocation of the mobile appliance and then directed to report the determined position to the requesting entity or enhanced services provider.

The monitoring of the RF transmissions from the mobile appliance or wireline interfaces to identify calls of interest is known as "tipping", and generally involves recognizing a call of interest being made from a mobile appliance and collecting the call setup information. Once the mobile appliance is identified and the call setup information is collected, the location determining system can be tasked to geolocate the mobile appliance.

Figure 1:
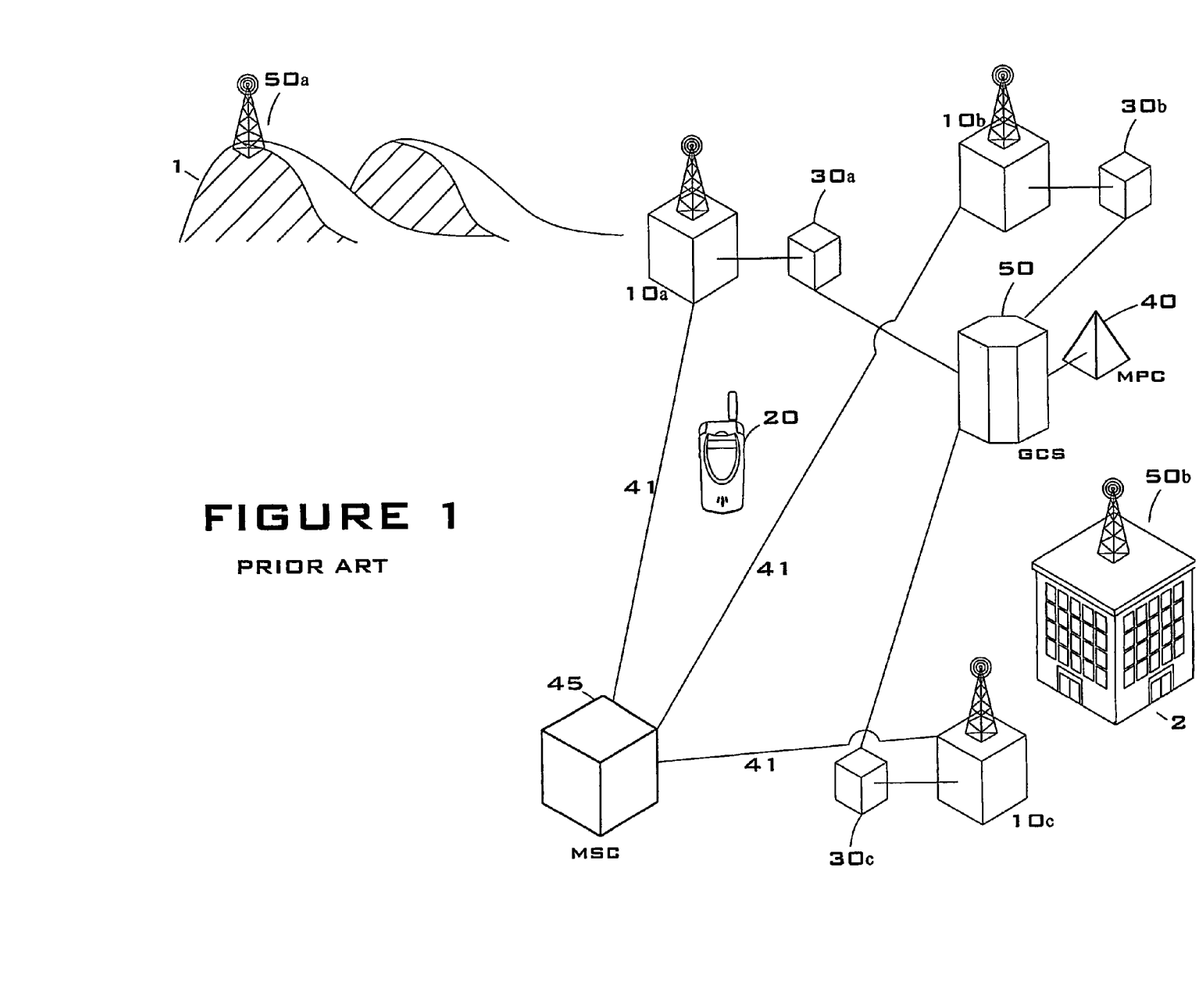
FIG. 1 is a prior art wireless communication system with a network overlay geolocation system.

FIG. 1 shows a conventional mobile-appliance communication system having base stations 10 *a-c* for communicating with a mobile appliance 20. Each base station 10 contains signal processing equipment and an antenna for transmitting to and receiving signals from the mobile appliance 20 as well as other base stations. A Base Station Controller ("BSC") and/or Mobile Switching Center ("MSC") 45 typically is connected to each base station 10 through a wireline connection 41. A mobile appliance location determining sensor 30, i.e., wireless location sensor ("WLS"), may be positioned at some or all of the base stations 10 to determine the location of mobile appliance 20 within the signal coverage area of the communication system.

A network overlay system is generally composed of two main components, one that resides at the base station that makes measurements on the RF signal emanating from the wireless device, the WLS 30, and one that resides at the mobile switch that tasks the WLS groups to collect data and then uses the data to compute a location estimate, the Geolocation Control System ("GCS") 50. In the normal course of operation, the GCS is tasked by an outside entity, e.g., the Mobile Positioning Center ("MPC") 40, to generate a location estimate on a particular mobile appliance. The tasking is accompanied by information on the mobile of interest including the serving base station and sector for the call and the RF channel (frequency, time slot, CDMA code, etc.) being used by the wireless communications network to complete the wireless connection. Once the GCS receives this tasking, it tasks a set of WLS units to make measurement on the RF emission of the mobile based on the serving sector. The WLS units make the measurements, and report the measurements to the GCS. The GCS then computes a location estimate using a mathematical or data matching algorithm. Alternatively, control signaling on RF or wireline interfaces used to set up calls in the wireless network can be scanned to detect the placement of a call of interest. The signaling that occurs on the RF control channel can be used to determine location, or call setup/channel assignment parameters can be extracted from the control messaging to determine which traffic channel to use for location related measurements.

Network overlay location systems typically locate a mobile appliance on the traffic channels of a wireless network. The system typically uses sensors employing techniques of Time Difference of Arrival ("TDOA") supplemented with Angle of Arrival ("AOA") in some cases to perform a multi-site location computation. The traffic channel assignment information is provided through a separate process, with one option being a wireline interface providing MOBINFO (IS-41 Mobile Information) parameters passed by the Mobile Positioning Center as part of the GPOSREQ (J-STD-036 Geolocation Position Request) message from the MPC to the GCS 50.

To meet the ever growing demand for mobile communication, wireless communication systems deploy repeater stations to expand range and concentration of coverage. In FIG. 1, a repeater 50a, associated with base station 10a, is located to extend the coverage area to encompass the back side of the mountain 1. The repeater 50b, associated with base station 10c, is mounted on a building and is used to provide service within the building 2.

Figure 2A:
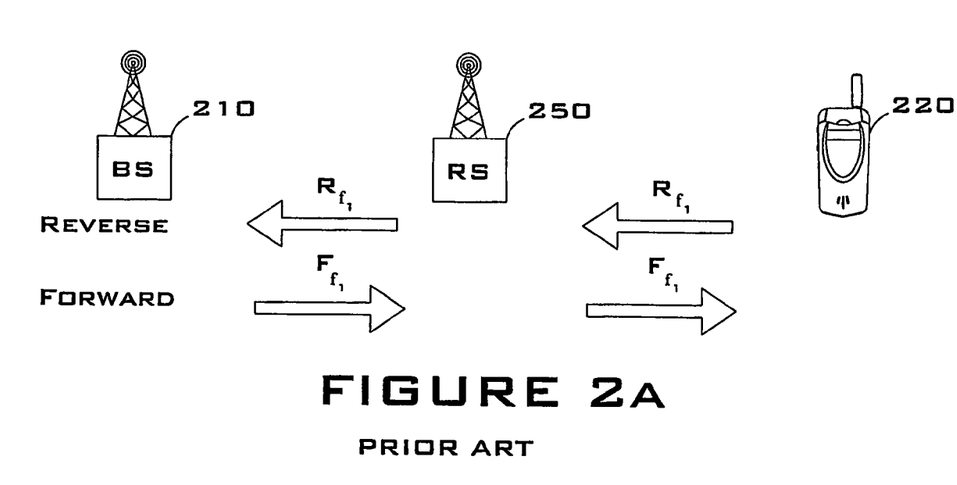
FIG. 2a is an illustration of the operation of a non-translating repeater station.

Repeaters typically fall into two categories: (1) non-translating, also known as wideband, and (2) translating, also known as narrowband. As shown in FIG. 2a, a non-translating repeater 250 simply passes the forward $F_{f1}$ and reverse $R_{f1}$ frequencies from the base station 210 and mobile appliance 220 respectively to and from the repeater coverage location. Often wideband repeaters are "in-building" or serve limited coverage areas. While the description of non-translating repeaters above and translating repeaters below are described in reference to frequency, their operation can equally be described in terms of channels, and the use of the term frequency should not be construed to limit the scope of the present disclosed subject matter.

Figure 2B:
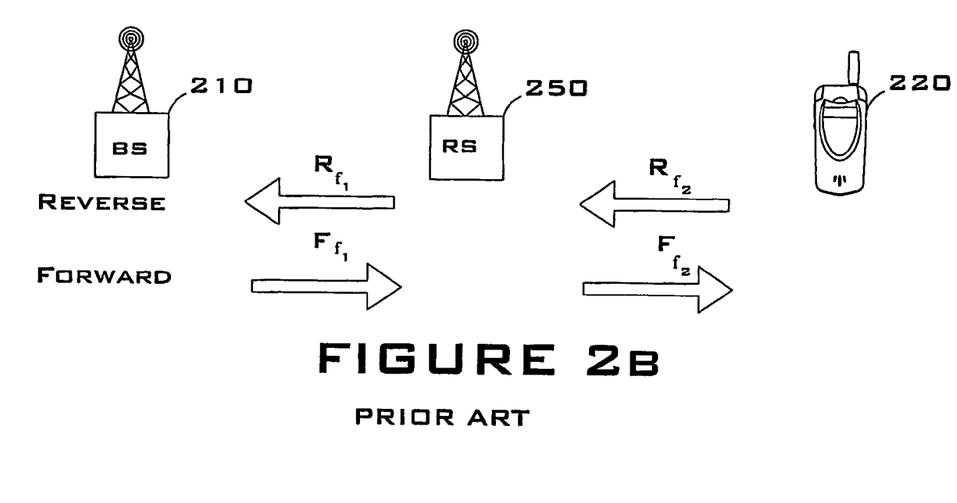
FIG. 2b is an illustration of the operation of a translating repeater station.

A translating repeater assigns the mobile to a different traffic channel unbeknownst to the base station, mobile switch, MPC, and the base station controller. As shown in FIG. 2b, the translating repeater uses the base station traffic channel $R_{f1}$ for repeater 250 to base station 210 communication while the mobile appliance 220 utilizes a separate frequency $R_{f2}$ for mobile to repeater communications. Translating repeaters act similarly in the forward direction using $F_{f1}$ from the base station 210 to the repeater station 250 and $F_{f2}$ from the repeater station 250 to the mobile appliance 220. In both cases, the existence of the repeater is usually transparent to the network.

The function of the repeater station can be assumed to be equivalent to converting all signals in some received bandwidth from a Radio Frequency (RF) to some Intermediate Frequency (IF). The IF signal bandwidth is then up-converted by suitably frequency shifting this bandwidth while concurrently applying both amplification and a fixed delay to the signals.

For example, let the set of signals transmitted by N mobiles in the repeaters input bandwidth be denoted by $$S(t) = \sum_{k=1}^{N} a(k)x(k, t)\sin(wt),$$

where the signal from a given mobile is denoted by x(k, t). The signal x(k, t) is contained in the repeater bandwidth and w is the angular frequency center of the RF bandwidth. The repeater downshifts the aggregate signal to generate $$D(t) = \sum_{k=1}^{N} a(k)x(k, t)\sin(vt),$$

in which v is now representative of the center of the IF bandwidth. The entire signal D(t) is now converted back to RF by operations that are equivalent to forming the signal $$R(t+T) = G\sum_{k=1}^{N} a(k)x(k, t)\sin(vt)\cos(wt-vt) + G\sum_{k=1}^{N} a(k)x(k, t)\cos(vt)\sin(wt-vt),$$

in which G is the repeater gain. The last equation can be written in a more convenient mathematical manner by noting that R(t) can be derived from D(t) by writing it as R(t+T)= Re{G exp(j(w−v)tI(t))}, where G exp(f(w−v)t) is the complex representation of the multiplicative signal introduced by the repeater on the downshifted signal bandwidth and I(t) is the complex representation of D(t).

Essentially, the function of the repeater is to convert the RF signal to an IF signal, delay and amplify that IF signal, up-convert the signal back to RF, and transmit the signal. This is true for both translating and non-translating repeaters.

Figure 3:
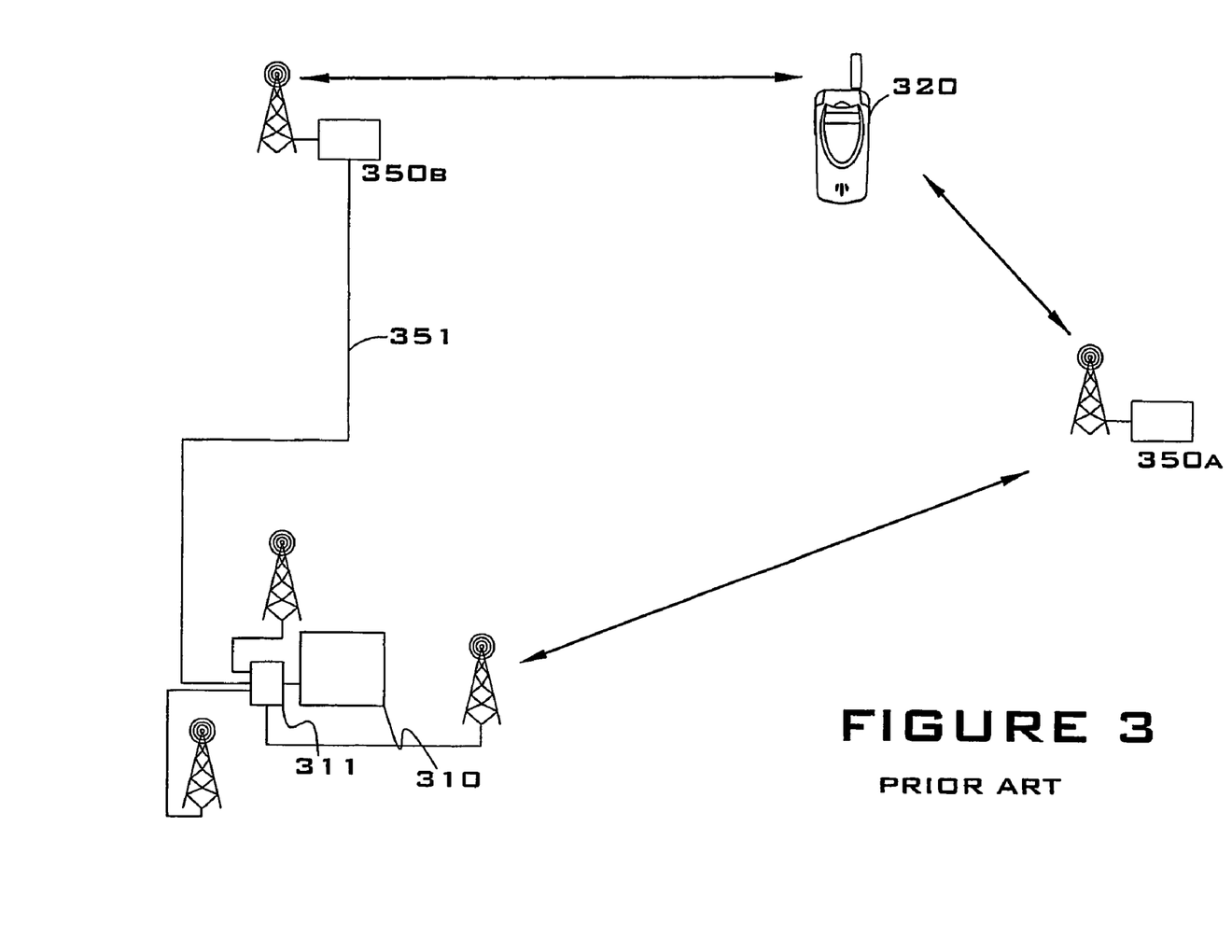
FIG. 3 is an illustration of a prior art wireless communication system with repeater stations connected with an RF link and over a tether.

Repeaters typically communicate with the host base station via an RF link as shown in FIG. 3 between base station 310 and repeater 350a. This connection allows remote operation of the repeater without physical ties back to the host base station, which is particularly advantageous in rugged or other areas where laying lines are difficult or costly. Some repeaters, generally non-translating repeaters, use a fiber optic or copper wire "tether" instead of an RF link to communicate with the host base station as shown in FIG. 3, where base station 310 is connected to repeater station 350b by tether 351. RF signals are placed onto the tether at the repeater and then summed into the normal base station antenna path at the antenna feed interface 311 at the host base station. After integration into the normal base station antenna path, the signal from the repeater is indistinguishable to the base station regarding its origin (e.g., from the base station antennas or from a tether). In this tether architecture as well, the host base station has no knowledge of the repeater's existence or that a call is being served by the repeater.

Neither the base station nor the switch knows that a repeater is serving a call. Therefore the GPOSREQ information from the MPC which, in part, originates from the switch, is not able to alert the Geolocation system that a repeater is in use. When a prior art network overlay location system attempts to locate a mobile being served by a repeater without knowing that a repeater is serving the mobile, a number of alternatives may occur. The location system may locate the mobile based on receiving only RF signals directly from the mobile at a sufficient number of sites to locate the mobile. This alternative is the same as if the repeater was not involved from the standpoint of the location system. Another alternative is that the location system would receive signals from the repeater backhaul link antenna and produce a location. Thus, the location of the repeater antenna (rather than the mobile) would be the "worst case" geolocation computed location.

For example, a repeater installed as an in-building distribution system would use indoor antennas to communicate with the indoor handsets and an outdoor antenna to communicate with the host base station. If the geolocation system were unable to locate the mobile itself, the location of the outdoor antenna (the repeater) would be used. Since this is the location of the building housing the mobile, this is a much better location estimate than Phase I cell-sector information and is often compliant within the FCC accuracy mandate over the given network. A Phase I system typically does not know of repeater existence and uses the host cell's cell-sector information for location. While acceptable in some cases, as identified above, using the location of repeater 50a in FIG. 1, would be of little use. In the case where the location system receives the RF signal from a mixed set of sources (some from the mobile and some from the repeater backhaul antenna), an erroneous location estimate can be generated. If only one signal is received, its path (either through the repeater or direct propagation) must be determined to calculate at an accurate location estimate. If the wrong assumption is made, the large delay through the repeater wrongly applied can add large errors to the TDOA surfaces and intersection points. In the case where the location system does not receive RF at sufficient WLS sites to generate a location estimate due to the effects of the repeater action or transmitted power of the mobile or directionality of the repeated signal from the repeater backhaul antenna, no location estimates will be reported.

Therefore, there is a need in the prior art for a network overlay geolocation system and method of operation in a host wireless communication system that provides accurate geolocation of mobiles served by repeater stations. In order to accomplish this, there is a need to overcome the deficiencies in the prior art by employing a novel geolocation system and method that is capable of identifying when a mobile's signal is being received via a repeater.

In view of this need, it is an object of the disclosed subject matter to obviate the deficiencies in the prior art and present an improved method for determining the location of a mobile appliance in a wireless communication system with base stations and a repeater for communicating with the mobile appliance.

It is also an object of the disclosed subject matter to present a method for determining whether a signal is received directly from the mobile or from a repeater in the communication network.

These objects and other advantages of the disclosed subject matter will be readily apparent to one skilled in the art to which the disclosure pertains from a perusal of the claims, the appended drawings, and the following detailed description of the preferred embodiments.

DETAILED DESCRIPTION

An important aspect of the presently disclosed subject matter is that the geolocation system or network analysis system can determine when a received signal from a mobile has passed through a repeater. Prior art systems do not have this capability and consequently treat all the signals received by the geolocation system as having been received directly from the target mobile. For example, the ability to determine if a signal from a mobile has passed through a repeater enables embodiments of the disclosed subject matter to determine in some instances (a) at least a default location of a mobile (e.g., at the repeater) where the prior art could determine no location at all, and/or (b) a location of the mobile where the prior art may return a location with large errors. The use of the method in a network analysis system allows for more efficient network management. The foregoing are exemplary only and shall not be used to limit the invention. These examples and others are discussed in more detail below.

The ability to discern the difference between direct signals and repeated signals (i.e., signals that arrive via a repeater) allows the geo-location system to better determine a location for the mobile and the network analysis system to collect data important to system operators.

The present subject matter relates to the case where signals can be received at location sensors, or other receivers, either directly from the mobile appliance or through a repeater. In the forgoing discussions the subject matter will be described in terms of a geo-location system, however as noted above, any network device receiving a signal from the repeaters can employ the described method.

The ability to determine whether a signal is received from a repeater is important to estimating the location of the mobile as the location related measurements must be adjusted to account for the longer path delay through a repeater. Further, with single or limited site hearability of the mobile, the ability to know if the signal propagated through the repeater allows the repeater transmit antenna location or equivalent to be used as a good approximation for the mobile appliance.

This disclosed subject matter allows repeater identification via the insertion of a low power, amplitude modulated RF signature based on a second signal. For reasons of this disclosure the Golay-Hadamard sequences will be discussed as the second signal, however other coded sequences are equally envisioned. This co-channel signal is generated by applying a specific form of Amplitude Modulation (AM) to the entire repeater signal bandwidth and serves as a signature identifying that a mobile is being served through a particular repeater station, whose identity can be uniquely determined from the RF characteristics introduced by the repeater itself The magnitude of the inband signal as well as any adjacent channel interference caused by the AM process can be controlled. When no signal is present in the repeater pass-band, the AM process generates a signature signal buried deep within the noise. When a signal is present, the signature signal can be used to uniquely identify the repeater.

In order to accomplish this, the following operations are performed within the repeater. The wideband signal w(t) or primary signal constituting the signal to be repeated at the repeater is AM modulated at the repeater using a narrowband signal of the form (1+r(t)), where for purposes of this disclosure r(t) is referred to a the second signal. The AM modulated signal is then subject to any pre-existing methodology of repetition used at that repeater, generally expressed as a delay on the signal followed by amplification.

The mathematical effect of this form of modulation is to generate a co-channel signal (e.g., the signature signal) w(t) r(t) in the repeater bandwidth. The 1 in the term (1+r(t)) simply replicates the primary signal (e.g., the mobile signal for uplink signals or the down link for base station signals). Since AM modulation is equivalent to multiplication, the modulation can also be viewed as multiplication of w(t) by the function (1+r(t)).

To illustrate the concept further, consider a particular narrowband channel. In the narrowband channel, if an active mobile call using signal s(t) was in progress, the co-channel signal generated by the AM process will be of the form s(t)r(t). If the channel were inactive, the co-channel signal will be of the form n(t)r(t) where n(t) is noise. By suitably controlling the norm (or average amplitude) of r(t), the magnitude of the co-channel component can be maintained at a much reduced power level with respect to the primary mobile signal s(t). Further, any spectral spillage into adjacent bins can be reduced below the noise power level in those bins by suitably manipulating the amplitude of r(t). Thus, the amplitude control of the signature signals allows the amplitude of the signature signal to lie buried in the naturally occurring noise that is present at the final destination receiver, i.e., the base station, the mobile appliance, or another network device.

In fact, by controlling the amplitude of the second signal r(t), both the co-channel signal component and the adjacent channel interference can be made as large as or as small as desired. The amplitude control is determined based on the relative power desired between the primary signal s(t) and the signature signal or co-channel component. After a proper determination is made, this amplitude is fixed at the repeater during operation.

Thus, for example in an active cellular channel, the introduced repeater identification signal, the signature signal can be at a power level 9 dB or lower than the primary signal; whereas, in an inactive channel, the signature signal will be 9 dB or lower than the preexisting noise in that channel. In every channel, the corresponding signature signal is at a power level 9 dB or lower than the pre-existing signal level in that channel. The 9 dB value is chosen simply to quantify the concept and any other number can be picked with equal applicability. For a given primary signal s(t), it is apparent that the second signal r(t) is what distinguishes the particular repeater. Thus each repeater has a unique second signal r(t), which is a narrowband waveform.

The collection of such second signals r(t) over a set of repeaters, denoted S, may be drawn from sets of waveforms with specific properties. For example, the set S may be orthogonal, quasi-orthogonal, or shift-orthogonal. The properties of the second signals r(t) used to generate the set S will, among other things, depend on the number of repeaters implemented in a cellular system cell or sector. A good candidate code set used in extensive simulations is the set of 26 waveforms in a Golay-Hadamard codebook, derived from complementary Golay sequences. However other sequences are equally envisioned when appropriate.

Figure 7:
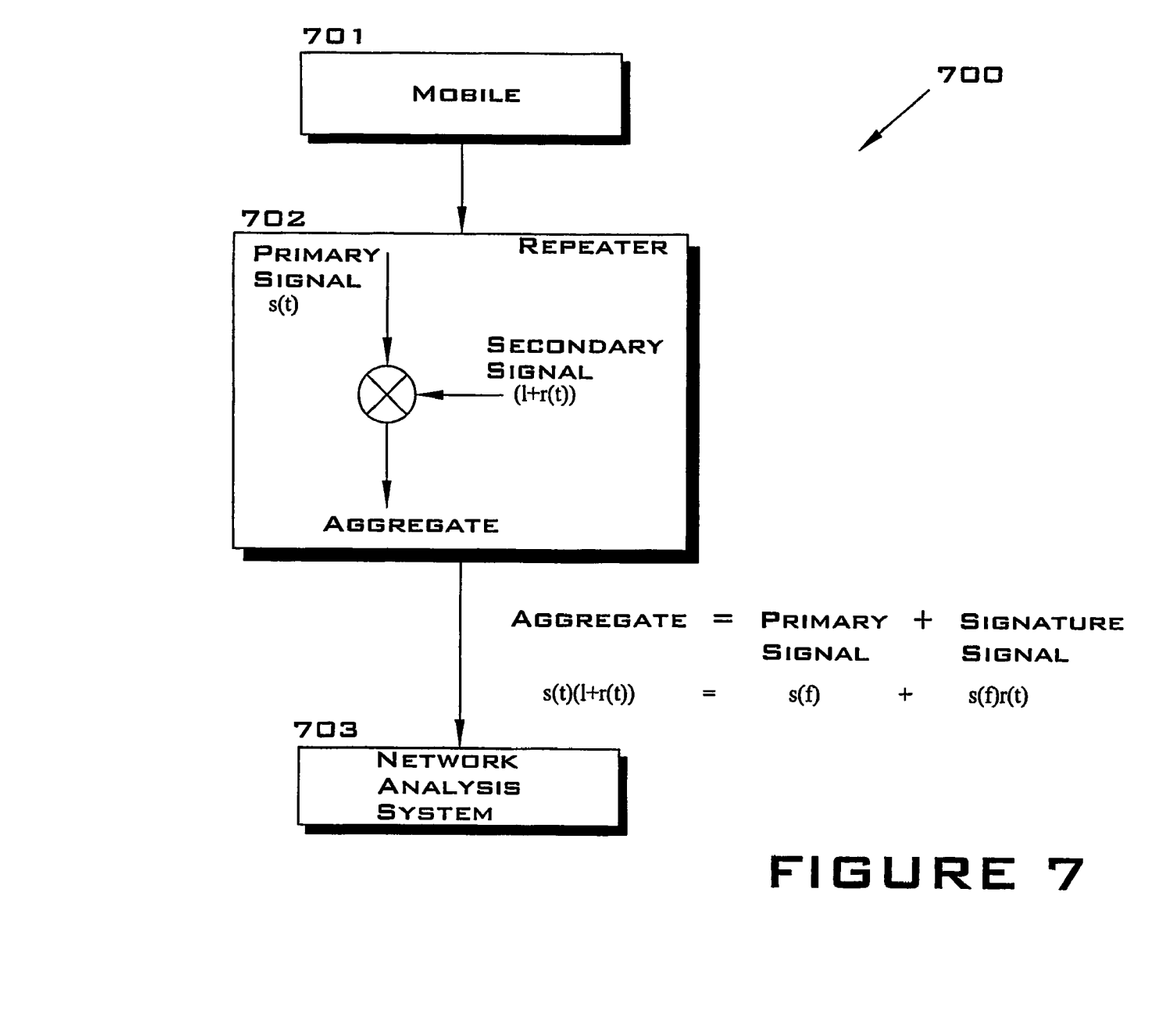
FIG. 7 is a representative schematic of a communication system according to an embodiment of the present subject matter.

An important aspect of the disclosed subject matter that needs to be highlighted is that the signature signal s(t)r(t) is formed as a function of the primary signal and the second signal. The signature signal is not the second signal available at the repeater which is added onto the primary signal. The signature signal differs based not only on the particular repeater but also on the primary signal that is input to the repeater. As shown in FIG. 7, the repeater 702 receives a primary signal from the mobile appliance 701 or other network transmitter. The primary signal s(t) is then multiplied by a function (1+r(t)) where r(t) is a second signal unique to the repeater. The output is the repeater is an aggregate signal s(t)(1+r(t)) including both the primary signal s(t) and the signature signal s(t)r(t). The network analysis system 703 then receives and processes the aggregate signal as described later to determine if the signal was received via a repeater and, if so, determines the specific repeater.

The repeaters may either apply their identifying signals, or signature signals, synchronously or asynchronously. A synchronous approach would require the repeaters to operate in unison with an extraneous clock but would provide greater discrimination of the repeater at the location sensor. The repeaters may also apply identifying signals in a repetitive loop so that the waveforms r(t) repeatedly cycle.

Figure 4:
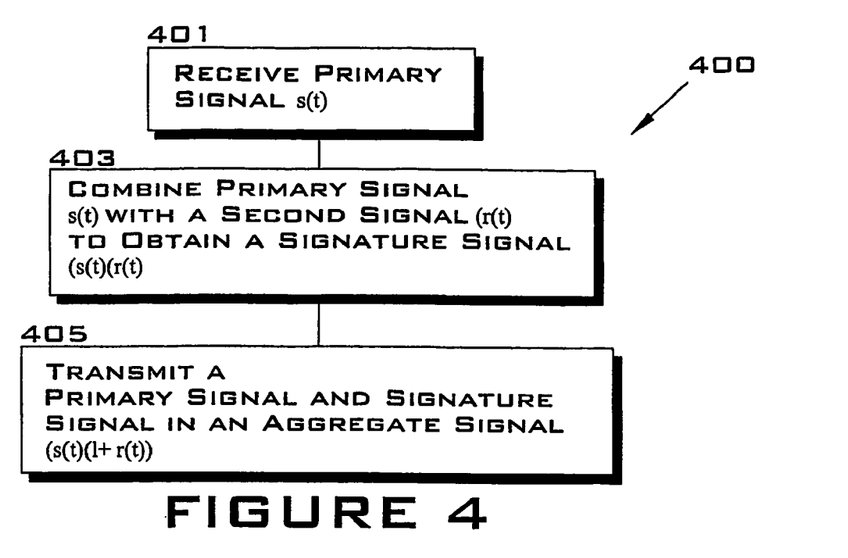
FIG. 4 is a representative flow chart for the operation of a repeater in an embodiment of the present subject matter.

FIG. 4 is a representative flow chart describing an embodiment of a repeater watermarking a primary signal. In the method 400, the repeater receives a primary signal s(t) as shown in Block 401. The primary signal as indicated earlier can come from a mobile appliance as an uplink signal; a base station as a downlink signal, or from another network device such as another repeater. The repeater then creates a signature signal as a function of the primary signal and a second signal which is associated with the repeater. In the embodiment shown in FIG. 4, the primary signal s(t) is multiplied by the second signal r(t) to obtain the signature signal s(t)r(t) as shown in Block 403. The repeater then transmits the primary signal s(t), or a copy thereof along with the amplitude controlled signature signal s(t)r(t) as an aggregate signal s(t)(1+r(t)) as shown in Block 405. The second signal r(t) may be an AM Golay Hadamard sequence or other code sequence.

The detection of the signature signal at the location sensor is formed from two hypothesis. The signal in a narrowband channel at the location sensor is either:

Hypothesis 1: s(t) plus noise or Hypothesis 2: s(t) (1+r(t)) plus noise.

The location sensor or receiver determines which of the hypothesis is true and if Hypothesis 2 is true, identify which r(t) in S is applicable thereby identifying the repeater used.

Figure 5:
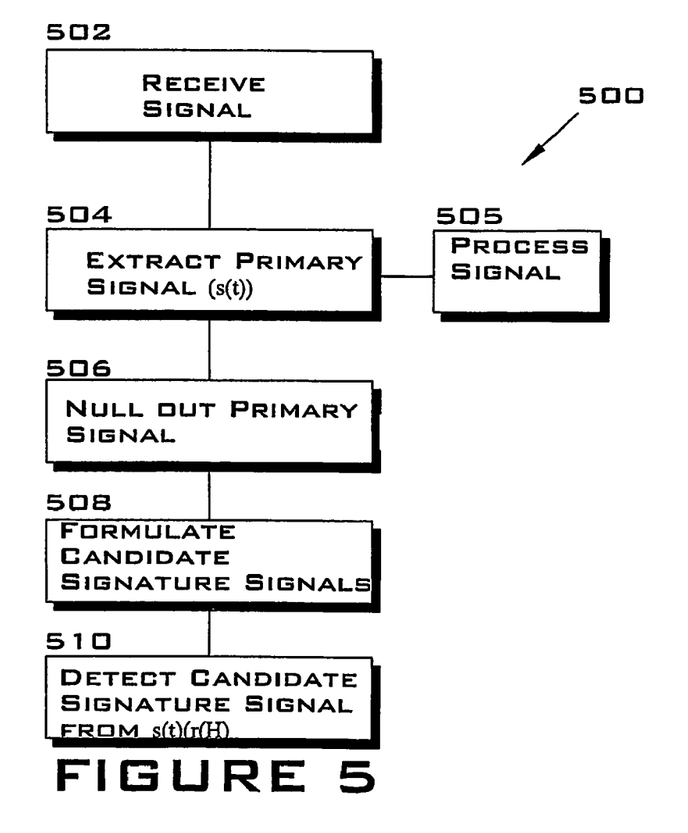
FIG. 5 is a representative flow chart for the operation of a network analysis system according to an embodiment of the present subject matter.

Since it is not possible to search for the signature signal without first extracting the primary signal from the aggregate signal received, the signal recovery proceeds in two stages. An embodiment of a method for signal recovery is shown in FIG. 5. The first stage is the detection of the primary signal, and the second stage is the computation of candidate signature signals or candidate aggregate signals based on the first derived primary signal and all possible candidate second signals from the repeater from which the aggregate signal could be transmitted from.

A location sensor of the geolocation system or receiver receiving a signal (e.g., a mobile uplink signal) proceeds in the following manner to determine whether the call was amplified by a repeater, and, if so, which repeater as shown in FIG. 5.

The receiver receives a signal, which may or may not be an aggregate signal, as shown in Block 502. The signal received by the receiver may come directly from a mobile or other system node in which case the signal is not an aggregate signal. If the signal is received via a repeater then it is an aggregate signal. The geolocation system or network analysis system extracts the primary signal as shown in Block 504, for example, by determining the signal waveform s(t) by methods known to those of skill in the art. Since the signature signal (if the signature signal exists) is below the noise level in the channel, this detection proceeds as well as it would in the absence of the AM process. That is, the introduction of the signature signal s(t)r(t) does not compromise the detection of the primary mobile signal s(t) in any significant manner. The extracted primary signal is processed to recover the data or voice information in Block 505.

The geolocation system in the embodiment shown in FIG. 5 may then null out the primary signal s(t) from the aggregate signal s(t) (1+r(t)) plus noise as shown in Block 506. Depending on the nulling technique used, the purity of extracting the residual signal s(t)r(t) will differ. In general, the result of the nulling process will be to generate a noisy version of the signal s(t)r(t). An additional source of perturbation on the signal s(t)r(t) will result if the channel is filtered. However, this step of nulling out the primary signal is not necessary for some embodiments of the present subject matter.

Having determined the primary signal s(t), it is possible to formulate the candidate signature signals s(t)r(t) as shown in Block 508. The present disclosure also envisions, for embodiments that do not null out the primary signal, formulating candidate aggregate signals s(t)(1+r(t)). The possible second signals r(t) associated with repeaters in operational range of the receiver can be acquired and stored in a number of ways known to those of skill in the art. The problem then reduces to detection of the known signature signal s(t)r(t) (possibly filtered) in the aggregate signal s(t)(1+r(t)) plus noise (if not nulled) or detection of the known signature signal s(t)r(t) (possibly filtered) in the nulled aggregate signal s(t)r(t) plus noise as shown in Block 510 where the primary signal is nulled. Detection of a known signal in noise is a problem that has been solved by numerous known methods and all applicable prior art methods are envisioned. If the candidate signature signal s(t)r(t) is not detected or the candidate aggregate signal s(t)(1+r(t)) is not detected, Hypothesis 1 holds, thus eliminating the possibility that the mobile signal was operated on (e.g., amplified) by a repeater. If the signal s(t)r(t) is detected, Hypothesis 2 holds, and the particular r(t) that effected the detection then unambiguously identifies the repeater.

Figure 6:
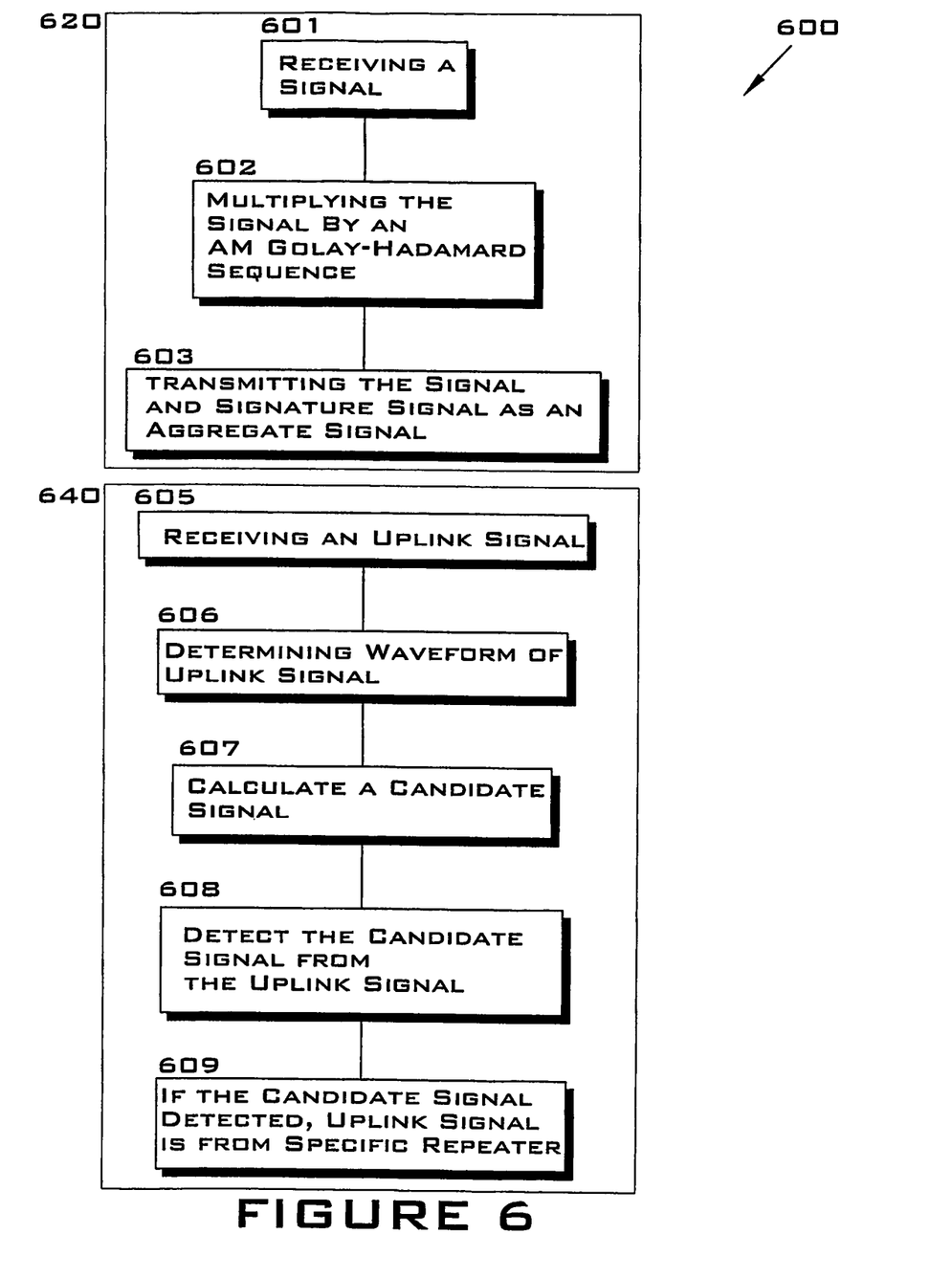
FIG. 6 is a representative flow chart for determining whether an uplink signal is received from a repeater according to an embodiment of the present subject matter.

FIG. 6 is a representative flow chart for a method 600 for determining if an uplink signal was received via a repeater according to an embodiment of the present subject matter. At the repeater 620 a primary signal is received from a mobile operating in the service area of the repeater 620 as shown in Block 601. The primary signal is then multiplied by a second signal, for this embodiment, an AM Golay Hadamard sequence associated with the particular repeater 620 as shown in Block 602. The primary signal and the signature signal which is a function of the primary signal and the sequence is transmitted as an aggregate signal to the base stations and wireless location sensors within range of the repeater as shown in Block 603.

At the geolocation system 640, particularly at the wireless location sensors at uplink signal is received as shown in Block 605. The waveform of the primary signal s(t) (e.g. uplink signal) is determined using known prior art methods as shown in Block 606. From the signal waveform of the primary signal s(t), candidate signals, either a candidate signature signal s(t)r(t)' or a candidate aggregate signal s(t)(1+r(t))' is calculated using the known second signals r(t) (e.g., AM Golay Hadamard sequence(s) of the repeater or set of repeaters) as shown in Block 607. The network analysis or geolocation system then uses prior art methods to detect the candidate signature signals or candidate aggregate signals in the uplink signal as shown if Block 608. If a candidate signal is found, then the uplink signal is received via a repeater and the specific repeater can be determined by the associated AM Golay Hadamard sequence as shown in Block 609.

No constraint exists on combining the scheme of this subject matter with other schemes to identify a repeater. For example, in a GSM cellular protocol, a parameter termed the Timing Advance (TA) parameter may be used to identify the radius at which a particular mobile may be located. This TA parameter may be used jointly with the scheme proposed here to increase the number of identifiable repeaters in a cell or sector.

While preferred embodiments of the present inventive system and method have been described, it is to be understood that the embodiments described are illustrative only and that the scope of the embodiments of the present inventive system and method is to be defined solely by the appended claims when accorded a full range of equivalence, many variations and modifications naturally occurring to those of skill in the art from a perusal hereof.

What we claim is:

1. In a communication system including a first node, a second node, and a repeater that applies a known modification to a primary communication signal passing therethrough that identifies the repeater, where the first node receives a first signal from the second node either directly or via the repeater, and where the first signal includes a primary communication signal and, if the first signal is received from the repeater, also includes a signature signal that is a function of the primary communication signal and the known modification applied by the repeater,
    the method of determining if a signal received by the first node is received directly from the second node or indirectly through the repeater, comprising the steps of:
    receiving the first signal at the first node;
    extracting the primary communication signal from the first signal;
    producing a candidate signature signal as a function of the primary communication signal and the known modification applied by the repeater; and
    determining whether the first signal has been received from the repeater by processing of the candidate signature signal and at least a portion of the first signal.

2. The method of claim 1 wherein the communication system is a wireless communication system.

3. The method of claim 1 wherein the first node is a network analysis system.

4. The method of claim 1 wherein the first node is a geolocation system.

5. The method of claim 1 wherein the second node is a mobile unit.

6. The method of claim 1, wherein the primary signal is a downlink signal.

7. The method of claim 1, wherein the first node is a mobile unit.

8. The method of claim 1, wherein the second node is a network analysis system.

9. The method of claim 1, wherein the second node is a geolocation system.

10. The method of claim 1, wherein the first signal is amplified such that the ratio of the primary signal to the signature signal is greater than unity.

11. The method of claim 1, wherein the primary signal is a uplink signal.

12. The method of claim 11, wherein the transmitted signature signal is 9 db less than the transmitted primary signal.

13. The method of claim 1, wherein the known modification is multiplication of a second signal.

14. The method of claim 13, wherein the second signal is an AM Golay Hadamard sequence.

15. In a communication system including a first node, a second node, and a repeater, wherein the first node receives a first signal from the second node either directly or via the repeater, a method of applying a known modification to a signal to enable a determination of a signal received by the first node is received directly from the second node or indirectly through the repeater, comprising the steps of:
at the repeater receiving a primary signal and creating a signature signal as a function of the primary signal and a known second signal, wherein the second signal identifies the repeater,
transmitting the primary signal and the signature signal as the first signal to the first node.

16. The method of claim 15 wherein the communication system is a wireless communication system.

17. The method of claim 15 wherein the first node is a network analysis system.

18. The method of claim 15 wherein the first node is a geolocation system.

19. The method of claim 15 wherein the second node is a mobile unit.

20. The method of claim 15 wherein the known second signal is a Golay Hadamard sequence.

21. The method of claim 15, wherein the signature signal is transmitted 9 db or less than the primary signal.

22. In a wireless communication system having one or more repeaters, a first node and a second node, a method of determining if a signal received at the first node is received directly or via one of the one or more repeaters comprising;
multiplying, at the one or more repeaters, a primary signal s(t) received from the second node by (1+r(t)), where r(t) is an AM Golay Hadamard sequence unique for each of the one or more repeaters to form the primary signal s(t) and a signature signal s(t)r(t) combined as an aggregate signal;
transmitting the aggregate signal s(t)(1+r(t)) to the first node;
detecting at the first node the primary signal s(t);
creating a set of candidate signature signals as a function of s(t) and the AM Golay Hadamard sequences for the one or more repeaters;
detecting one or more of the candidate signature signals s(t)r(t)' in the aggregate signal to thereby determine if the signal is received via the one or more repeaters.

23. The method of claim 22, wherein the repeater transmitting the aggregate signal is identified by the AM Golay Hadamard sequence r(t).

24. The method of claim 22, wherein the one or more repeaters are synchronized.

25. The method of claim 22, wherein the one or more repeaters are not synchronized.

26. The method of claim 22, wherein the step of detecting the primary signal includes nulling the primary signal s(t) from the aggregate signal.

27. The method of claim 22, wherein the AM Golay Hadamard sequence is a repeated AM Golay Hadamard sequence.

28. A wireless communication system having a plurality of repeaters and a network overlay geolocation system, said geolocation system having a plurality of wireless location sensors for measuring an attribute of an uplink signal of a mobile appliance for determining the location of the mobile appliance based on the attribute and the location of the wireless location sensors, the improvement wherein each of the plurality of repeaters have an associated unique AM Golay Hadamard sequence and a signal multiplier for applying the associated unique AM Golay Hadamard sequence to a copy of the uplink signal received from the mobile appliance.

29. The system of claim 28, wherein the geolocation system comprises a set of AM Golay Hadamard sequences corresponding to the associated unique AM Golay Hadamard sequences for each of the plurality of repeaters.

30. The system of claim 28, wherein the plurality of repeaters are synchronized.

31. The method of claim 28 wherein the first node is a network analysis system.

32. The method of claim 28 wherein the first node is a geolocation system.

33. The method of claim 28 wherein the second node is a mobile unit.

34. The method of claim 28, wherein the first node is a mobile unit.

35. The method of claim 28, wherein the second node is a network analysis system.

36. The method of claim 28, wherein the second node is a geolocation system.

37. In a communication system including a first node, a second node, and a repeater that applies a known modification to a primary communication signal passing therethrough that identifies the repeater, where the first node receives a first signal from the second node either directly or via the repeater, and where the first signal includes a primary communication signal and, if the first signal is received from the repeater, also includes a signature signal that is a function of the primary communication signal and the known modification applied by the repeater,
the method of determining if a signal received by the first node is received directly from the second node or indirectly through the repeater, comprising the steps of:
receiving the first signal at the first node;
detecting the primary communication signal from the first signal;
producing a candidate aggregate signal as a function of the primary communication signal and the known modification applied by the repeater; and
determining whether the first signal has been received from the repeater by processing of the candidate aggregate signal and at least a portion of the first signal.

38. The method of claim 37 wherein the first node is a network analysis system.

39. The method of claim 37 wherein the first node is a geolocation system.

40. The method of claim 37 wherein the second node is a mobile unit.

41. The method of claim 37, wherein the primary signal is a uplink signal.

42. The method of claim 37, wherein the primary signal is a downlink signal.

43. The method of claim 37, wherein the first signal is amplified such that the ratio of the primary signal to the signature signal is greater than unity.

44. The method of claim 37, wherein the first node is a mobile unit.

45. The method of claim 37, wherein the second node is a network analysis system.

46. The method of claim 37, wherein the second node is a geolocation system.

* * * * *